(12) United States Patent
Brellochs et al.

(10) Patent No.: US 11,167,989 B2
(45) Date of Patent: Nov. 9, 2021

(54) METHOD FOR RECOVERING PHOSPHORUS

(71) Applicant: ZENTRUM FÜR SONNENENERGIE-UND WASSERSTOFF-FORSCHUNG BADEN-WÜRTTEMBERG GEMEINNÜTZIGE STIFTUNG, Stuttgart (DE)

(72) Inventors: Jochen Brellochs, Stuttgart (DE); Michael Specht, Waldenbuch (DE); Ulrich Zuberbühler, Stuttgart (DE); Christian Eder, Bexbach (DE); Christoph Kornmayer, Freiburg (DE); Benjamin Klausing, Ettenheim (DE); Martin Schaub, Lahr (DE)

(73) Assignee: ZENTRUM FÜR SONNENENERGIE- UND WASSERSTOFF-FORSCHUNG BADEN-WÜRTTEMBERG GEMEINNÜTZIGE STIFTUNG, Stuttgart (DE)

( * ) Notice: Subject to any disclaimer, the term of this patent is extended or adjusted under 35 U.S.C. 154(b) by 282 days.

(21) Appl. No.: 15/758,663

(22) PCT Filed: Aug. 22, 2016

(86) PCT No.: PCT/EP2016/069801
§ 371 (c)(1),
(2) Date: Mar. 8, 2018

(87) PCT Pub. No.: WO2017/042022
PCT Pub. Date: Mar. 16, 2017

(65) Prior Publication Data
US 2018/0273383 A1   Sep. 27, 2018

(30) Foreign Application Priority Data

Sep. 9, 2015  (DE) ..................... 10 2015 115 119.7

(51) Int. Cl.
*C01B 25/22* (2006.01)
*C05F 1/00* (2006.01)
(Continued)

(52) U.S. Cl.
CPC ................ *C01B 25/22* (2013.01); *C05B 3/00* (2013.01); *C05B 11/02* (2013.01); *C05B 11/06* (2013.01);
(Continued)

(58) Field of Classification Search
CPC .... C01B 25/22; C05F 1/00; C05F 9/00; C05F 7/00; C05B 13/06; C05B 3/00;
(Continued)

(56) References Cited

U.S. PATENT DOCUMENTS 4,352,332 A    10/1982  Baston
4,359,005 A *  11/1982  Baston ....................... B01J 8/32
                                                        110/237

(Continued)

FOREIGN PATENT DOCUMENTS

JP    54-045272 A    4/1979
JP    55-087099 A    7/1980
(Continued)

OTHER PUBLICATIONS

International Search Report dated Nov. 18, 2016 issued in corresponding International Application No. PCT/EP2016/069801.
(Continued)

*Primary Examiner* — Anthony J Zimmer
(74) *Attorney, Agent, or Firm* — Nath, Goldberg & Meyer; Tanya E. Harkins; Jerald L. Meyer

(57) ABSTRACT

The present invention concerns a method for recovering phosphorus by thermochemical reaction of a phosphorus-
(Continued)

containing material such as an alternative fuel, for example, in the presence of calcium-containing particles in a moving bed reactor and subsequent separation of fines enriched with phosphorus from the moving bed reactor. Furthermore, the present invention concerns the use of a recyclable material obtained by the method as a fertilizer or fertilizer additive.

10 Claims, 1 Drawing Sheet

(51) Int. Cl.
    *C05B 13/06*     (2006.01)
    *C05B 3/00*     (2006.01)
    *C05D 3/02*     (2006.01)
    *C05F 9/00*     (2006.01)
    *C05F 7/00*     (2006.01)
    *C05B 11/02*     (2006.01)
    *C05B 11/06*     (2006.01)
    *C05B 11/08*     (2006.01)
    *C05B 11/10*     (2006.01)

(52) U.S. Cl.
    CPC ............. *C05B 11/08* (2013.01); *C05B 11/10* (2013.01); *C05B 13/06* (2013.01); *C05D 3/02* (2013.01); *C05F 1/00* (2013.01); *C05F 7/00* (2013.01); *C05F 9/00* (2013.01); *Y02A 40/20* (2018.01); *Y02P 20/145* (2015.11)

(58) Field of Classification Search
    CPC ......... C05B 11/02; C05B 11/06; C05B 11/08; C05B 11/10; C05D 3/02; Y02P 20/145; Y02A 40/214; Y02A 40/213; Y02A 40/201
    See application file for complete search history.

(56) References Cited

U.S. PATENT DOCUMENTS

| | | | | |
|---|---|---|---|---|
| 4,711,185 | A | * | 12/1987 | Hofmann ................. A62D 3/40 110/210 |
| 4,822,583 | A | * | 4/1989 | Finley .................... C01B 25/01 423/322 |
| 4,902,491 | A | * | 2/1990 | Finley .................... C01B 25/01 423/304 |
| 2015/0017085 | A1 | | 1/2015 | Britton et al. |

FOREIGN PATENT DOCUMENTS

| | | |
|---|---|---|
| JP | H7-237909 A | 9/1995 |
| JP | 2003-190967 A | 7/2003 |
| JP | 2005-255444 A | 9/2005 |
| NL | 8401313 A | 11/1985 |
| WO | 2010/130589 A1 | 11/2010 |

OTHER PUBLICATIONS

English translation of first Office Action in corresponding JP Application No. 2018-512428 dated Oct. 8, 2019.

* cited by examiner

METHOD FOR RECOVERING PHOSPHORUS

This is a National Phase Application filed under 35 U.S.C. 371 as a national stage of PCT/EP2016/069801, filed Aug. 22, 2016, an application claiming the benefit of German Application No. 10 2015 115 119.7, filed Sep. 9, 2015, the content of each of which is hereby incorporated by reference in its entirety.

FIELD OF THE INVENTION

The present invention relates to a method for recovering phosphorus by thermochemical reaction of a phosphorus-containing material such as, for example, a phosphorus-containing alternative fuel, in the presence of calcium-containing particles in a moving bed reactor, and subsequent separation of fines enriched with phosphorus from the moving bed reactor. The present invention furthermore relates to the use of a phosphorus-containing recyclable material obtained by the method as a fertilizer or fertilizer additive.

PRIOR ART

Agricultural exploitation removes mineral raw materials such as phosphorus-containing compounds, for example, from the ground that has been used, which latter has then to be resupplied with mineral fertilizers. The material and energetic use of biomass such as that from household waste or sewage sludge is associated with the removal of nutrients from the natural material cycles. Maintaining soil fertility by adding artificial multi-component fertilizers of fossil origins does not constitute a long-term solution. In particular, phosphorus is a limited raw material and using it efficiently for fertile soils is of vital importance in the light of increasing global population. The desire for sustainability is bringing the closing of natural nutrient cycles ever more to the fore.

The global availability of fossil rock phosphates, which have limestone-based phosphates as their major ingredient, is $6 \times 10^{10}$ tonnes. The geographical distribution of their deposits is uneven. They are primarily found in Africa as well as in China, Russia and the USA, and also in the Middle East, but there are no economically significant deposits in Europe.

The annual phosphorus potential from secondary sources in Germany is approximately 130000 tonnes of phosphorus. Of this, barely 60000 tonnes are contained in sewage sludge, approximately 30000 tonnes in animal and meat bone meal, and approximately 25000 tonnes in biowaste, slaughterhouse waste and green waste.

It is therefore necessary to recover the raw materials removed from the soil by processing biomass and the raw materials contained therein.

Ash from the combustion of phosphorus-containing materials such as alternative fuel (AF) or sewage sludge, for example, are suitable raw material sources because of their high phosphorus content. However, because of the poor phytoavailability of the phosphorus contained in the ash and possible pollutant content, using the ash directly as a fertilizer or phosphorus-fertilizer additive is not usually possible.

Residues from the combustion of phosphorus-containing fuels such as in gasification plants or coal fired power stations, for example, are thus to a large extent dumped or cemented and therefore are no longer available to the material cycles as raw material sources.

Thus, there is a need for recovering phosphorus from phosphorus-containing fuels and for returning them to the natural material cycles.

WO 2011/137880 concerns a method for the production of phosphate and multi-component nutrient fertilizers from regenerative phosphorus-containing substances and their use in agricultural areas. In this case, ash from the mono-combustion of sewage sludge is digested with orthophosphoric acid to form calcium dihydrogen phosphate. However, the necessary addition in this case of large quantities of orthophosphoric acid makes the method uneconomic on an industrial scale. Furthermore, during the thermochemical conversion of phosphorus-containing fuels such as sewage sludge or alternative fuel, the recyclable material phosphorus is vitrified at high temperatures by ash softening, and thus is no longer available for phosphorus recovery.

WO2009/100937 in particular concerns a fluidized bed material which consists of at least one metal oxide and/or at least one carbonate, as well as its use for $CO_2$ absorption and for the separation of sulphur compounds and other impurities which are usually contained in crude gases.

OBJECTIVE OF THE INVENTION

Thus, the objective of the present invention is to provide a method by means of which phosphorus contained in phosphorus-containing materials such as fuels or alternative fuels can be recovered. Furthermore, the phosphorus obtained in this manner should be capable of being returned to the natural raw material cycle.

SUMMARY OF THE INVENTION

The above objective is achieved by means of a method for phosphorus recovery as well as the use of recovered phosphorus. Preferred or particularly appropriate embodiments of the invention are provided.

Thus, the invention concerns a method comprising the following steps:
i) thermochemical reaction of a phosphorus-containing material in the presence of calcium-containing particles in a moving bed reactor,
ii) separation of wear or fines enriched with phosphorus from the moving bed reactor, as well as, optionally:
iii) reaction of the wear or fines enriched with phosphorus obtained from step ii) with an acid in order to obtain a phytoavailable phosphorus-enriched useful or recyclable material.

In a further aspect, the invention concerns the use of the useful or recyclable material obtained in step iii) as a fertilizer or fertilizer additive.

DETAILED DESCRIPTION OF THE INVENTION

Surprisingly, in the present invention, it has been discovered that the disadvantages of the prior art can be overcome by adding calcium-containing particles as the bed material for a moving bed reactor. Furthermore, unexpectedly, it has been discovered that by means of combustion or gasification of phosphorus-containing materials in a moving bed reactor, with added calcium-containing particles, phosphorus can be chemically bound as the phosphate and abraded from the particles during the combustion or gasification and therefore isolated from the reactor as phosphorus-containing wear or fines. Furthermore, the phosphorus obtained thereby, chemically bound as the phosphate, can be obtained in a phytoaccessible form by acidification. The recyclable material obtained thereby can be used as a phosphorus-containing fertilizer or fertilizer additive or can be processed into it. The recovered phosphorus can thus be returned to the natural material cycle. Further, it has surprisingly been discovered that by carrying out the claimed method, impurities such as heavy metals, for example, can be depleted, whereupon the recyclable material obtained is accessible to a substantial extent for further technical use.

The "phosphorus-containing material" used in the method in accordance with the invention encompasses all phosphorus-containing materials which can be reacted thermochemically in a moving bed reactor. The phosphorus-containing material may be of organic or inorganic origin or comprise mixtures of organic and inorganic materials, for example sewage sludge, alternative fuel, domestic and commercial waste, waste wood, lightweight scrap, paper and pulp, packaging materials and also pyrolysis products produced from these materials.

Preferably, the phosphorus-containing material is a fuel or an alternative fuel (AF). Any of the usual secondary fuels which are obtained from waste are encompassed by the term "alternative fuel" such as, for example, industrial waste, commercial waste or household waste, wherein waste which contains a high proportion of phosphorus-containing materials is preferred. Fuels with a high biomass content are particularly preferred. Examples of particularly phosphorus-rich fuels are sewage sludge, fermentation residue, residual waste from fermentation, animal processing residues such as, for example, slaughterhouse waste, animal or bone meal, as well as green waste such as, for example, waste from agriculture or forestry or market gardening. Solid fuels or dry fuels are preferred over wet or liquid fuels. If necessary, conventional fuels may also be added to the phosphorus-containing material, for example anthracite and/or brown coal. Alternatively, conventional fuels may also be used as the phosphorus-containing material, provided that they contain proportions of phosphorus-containing compounds.

The thermochemical reaction of phosphorus-containing materials in the presence of calcium-containing particles may be carried out in any moving bed reactor such as a fluidized bed reactor or a rotary drum reactor. During the thermochemical reaction, typically, the phosphorus-containing material and the bed material of the moving bed reactor are converted into a gas or vapour mixture and a solid mixture.

In this regard, the bed material of the reactor usually acts as the heat transfer medium in order to heat up the phosphorus-containing material and as a catalyst for the reaction of the phosphorus-containing material used as the fuel. In addition, in particular, the bed material catalyses the reaction of intermediate products produced during the combustion/gasification, such as tars, into gaseous products.

Thus, one function of the bed material is to transform impurities in the process, such as tars or other long-chain hydrocarbon-containing compounds, for example, in particular compounds which are liquid at room temperature (25° C.) or solid hydrocarbon-containing compounds, into low molecular weight compounds, in particular hydrocarbons which are gaseous at room temperature. In this regard, a product may be obtained which is not only enriched with phosphorus, but is simultaneously free from impurities such as hydrocarbon compounds which are solid or liquid at room temperature, for example.

Furthermore, the material can bind pollutants such as sulphur or halogens such as chlorine or fluorine, for example, which are thus only present in the gas phase and in the fines in reduced amounts. Binding the pollutants in the bed material can be carried out in this regard both by chemical binding (corresponds to absorption) and by adsorption.

Preferably, the thermochemical reaction is carried out in a fluidized bed reactor such as the fluidized bed reactor described in either WO 2009/115549 or WO 2010/003968. In this regard, one or more fluidized bed reactors may be coupled together such as, for example, a stationary fluidized bed reactor as well as a discharging fluidized bed reactor. The reaction in the fluidized bed reactor may be carried out both under autothermal gasification/combustion conditions, wherein a portion of the biomass in the fluidized bed is gasified/burnt to make up for the continuous endothermic reaction, and also under allothermal gasification conditions, wherein the heat required is supplied by heat transfer. During the thermochemical reaction of the phosphorus-containing material, its mineral fraction is converted into ash, whereupon the phosphorus component of the phosphorus-containing material, because of the presence of calcium-containing particles, is transformed into the form of calcium phosphates and is thus chemically bound.

An example of a typical process in a fluidized bed reactor comprises a stationary fluidized bed process, i.e. where the fluidized bed material is not discharged, a circulating fluidized bed process, i.e. where the fluidized bed material is discharged with recycling of the fluidized bed material, and/or a multiple fluidized bed process.

A typical multiple fluidized bed process consists of at least two coupled fluidized beds and comprises at least:

one stationary/non-fluidized bed material-discharging, and one circulating/fluidized bed material-discharging fluidized bed with fluidized bed material recycling to the stationary fluidized bed, two stationary/non-fluidized bed material-discharging fluidized beds which, for example, could be coupled, such as, for example, via a third circulating/fluidized bed material-discharging fluidized bed with recycling of fluidized bed material to one of the two stationary fluidized beds, and two circulating/fluidized bed material-discharging fluidized beds with recycling of fluidized bed material to the respective other circulating fluidized bed.

BRIEF DESCRIPTION OF THE DRAWINGS

Identical reference numerals in FIGS. 1 and 2 have identical meanings.

Gasification processes (FIG. 1) are intended to transform the preferably solid fuel into a gaseous fuel, and thus to obtain chemically stored energy in the form of the calorific value in the product gas. The product gas is then upgraded materially and/or energetically.

Combustion processes (FIG. 2) are intended to transform the chemical energy stored in the fuel into thermal energy as completely as possible. At the end of the process, a flue gas is left which preferably no longer contains chemical energy, but rather only latent and sensible heat.

Figure 1:
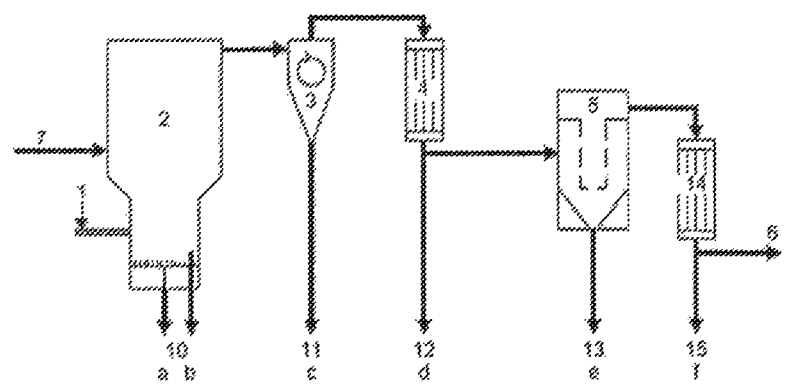
FIG. 1 shows an exemplary embodiment of a typical reactor apparatus for a gasification method.

A typical reactor apparatus for a gasification method is shown in FIG. 1, wherein the reactor components are shown as follows:
1 educt inlet
2 reactor
3 cyclone/separator
4 heat exchanger
5 filter
6 product gas
7 bed material inlet
10 discharge for solid fractions a and b
11 discharge for solid fraction c
12 discharge for solid fraction d
13 discharge for solid fraction e
14 heat exchanger
15 discharge for solid fraction f as well as liquid fraction.

Description of the gasification method shown in FIG. 1 by way of example:

The fuel to be processed is introduced via the educt inlet system 1, in the example here into a fluidized bed gasifier as reactor 2, and reacted under autothermal and/or allothermal conditions. This transformation may be carried out in one or more coupled reactors and takes place at temperatures of >600° C.

The bed material required for the reactor 2 is introduced into the reactor 2 via the bed material inlet system 7.

The solid products in the reactor 2, which primarily consist of heavy inert components, are withdrawn as solid fractions a (bed material/ash enriched with impurities) and b (bed material/ash) via the discharge 10.

Because of the intensive, thorough mixing of the Ca-based bed material, at the surface of the individual grains of bed material, abrasion of the calcium phosphate and of the bed material occurs which is dictated by the hardness of the bed material and by the intensity of the fluidization, and the dust-like fines which are formed are withdrawn overhead from the reactor with the fly ash. The product gas which is produced leaves the reactor 2 in the direction of the subsequent cyclone 3 together with the fly ash and smaller bed material particles (fines) which are entrained because of the speed of the flow.

In cyclone 3, the fraction of the fly ash/bed material mixture which can be deposited is separated and trickles into the solid discharge 11 of the cyclone 3 as the solid fraction c.

This ash has a higher phosphorus content than the bed ash in reactor 2.

The fine fly ash/bed material mixture which cannot be separated in the cyclone 3 passes through the cyclone 3 and enters the downstream heat exchanger 4 where again, deposited fly ash/bed material mixture can be withdrawn from the discharge 12 as the solid fraction d.

Next, the product gas together with the fly ash/bed material mixture still contained in the product gas enters the filter 5. The fly ash/bed material mixture is removed up to a specific particle size and extracted from the method via the discharge 13 for further use as the solid fraction e.

The fly ash/bed material mixtures c, d and e have a higher phosphorus content compared with the solid fractions a and b in reactor 2.

In a downstream heat exchanger 14, the product gas can be cooled further and further settling components of the fly ash/bed material mixture are withdrawn as the solid fraction f via the discharge 15. Upon cooling below the dew point, condensable gas components (vapours) can also be condensed and withdrawn as a liquid.

The cleaned product gas 6 leaves the process and can then be used in subsequent process steps either energetically or materially.

Figure 2:
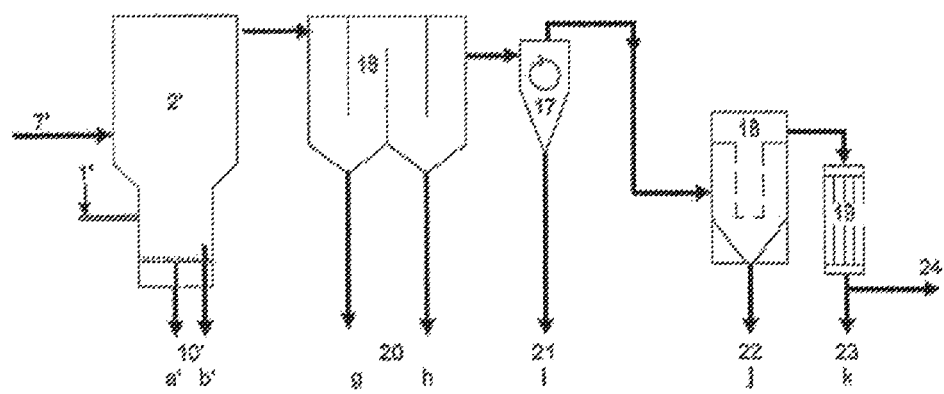
FIG. 2 shows an exemplary embodiment of a typical reactor apparatus for a combustion method.

A typical reactor apparatus for a gasification method is shown in FIG. 2, wherein the reactor components are as follows:
1' educt inlet
2' reactor
7' bed material inlet
10' discharge for solid fractions a' and b'
16 vaporizer (heat exchanger)
17 cyclone/separator (can also be dispensed with)
18 filter and/or adsorber
19 economiser or flue gas condenser (heat exchanger)
20 discharge for solid fractions g and h
21 discharge for solid fraction i
22 discharge for solid fraction j
23 discharge for solid fraction k as well as liquid fraction
24 flue gas.

Description of the combustion method shown in FIG. 2 by way of example:

The fuel to be processed is introduced via the educt inlet system 1', in the example here into a fluidized bed gasifier as reactor 2', and transformed under autothermal conditions. This transformation may be carried out in one or more coupled reactors and takes place at temperatures of >600° C.

The bed material required for the reactor 2' is introduced into the reactor 2' via the bed material inlet system 7'.

The solid products in the reactor 2', which primarily consist of heavy inert components, are withdrawn as solid fractions a' (bed material/ash enriched with impurities) and b' (bed material/ash) via the discharge 10'.

Because of the intensive, thorough mixing of the Ca-based bed material, at the surface of the individual grains of bed material, abrasion of the calcium phosphate and of the bed material occurs which is dictated by the hardness of the bed material and by the intensity of the fluidization, and the dust-like fines which are formed are withdrawn overhead from the reactor with the fly ash.

The flue gas from the combustion leaves the reactor 2' and passes through the downstream vaporizer 16 together with the fly ash entrained by the speed of the flow and which could possibly be further softened, and bed material particles (fines). The flue gas cools down by exchange of heat; any softened ash solidifies into solid particles. During the turns of the flue gas, in which the direction of the flow is changed from vertically downwards to vertically upwards, the fly ash and bed material particles are separated out gravimetrically and extracted via a plurality of extraction points 20 as solid fractions g and h.

The flue gas leaves the vaporizer 16 in the direction of the optional downstream cyclone/separator 17. In the cyclone 17, the separable fraction of the fly ash/bed material mixture is separated and trickles into the solid discharge 21 of the cyclone 17 as the solid fraction i.

The fine fly ash/bed material mixture which cannot be separated in the cyclone 17 then reaches the filter 18 with the flue gas. The fly ash/bed material mixture is separated in filter 18 up to a specific particle size and is withdrawn from the method at the discharge 22 for a further use as solid fraction j.

The fly ash/bed material mixtures g, h, i and j have a higher phosphorus content compared with the solid fractions a' and b' from reactor 2'.

In a downstream economiser or flue gas condenser 19 (heat exchanger), the flue gas can be cooled further and further portions of the fly ash/bed material mixture which can be deposited are withdrawn via the discharge 23 as solid fraction k. Upon cooling below the respective dew points, condensable gas components (vapours) can also be condensed and withdrawn as a liquid.

The flue gas 24 from which the dust has been removed leaves the process and can now be used energetically by further cooling, for example by means of an ORC process.

Binding of phosphorus is carried out:
in the fluidized bed process, in the calcium-containing fluidized bed material and/or in the calcium-containing fluidized bed material fines,
and/or in the fluidized bed discharge, preferably in the fluidized bed discharge.

The thermochemical reaction is usually carried out at a temperature below the ash softening temperature, in order to prevent vitrification of the ash and the formation of agglomerates and/or deposits. The preferred temperature range is between 400° C. and 1100° C., particularly preferably between 600° C. and 1100° C. The expression "thermochemical reaction" as used herein in particular encompasses pyrolysis and/or gasification and/or combustion of the phosphorus-containing material.

The calcium-containing particles contained in the bed material in particular comprise calcium oxide (CaO) and/or calcium carbonate particles ($CaCO_3$). Normally, the calcium-containing particles which are in the bed material prior to thermochemical reaction as the starting material essentially comprise calcium carbonate ($CaCO_3$), preferably in a fraction of >90% by weight with respect to the total weight of the calcium-containing particles. In addition, further mineral components may be present, in particular carbonates of other metals, such as magnesium carbonate, for example. When using dolomite in particular, or fractions of dolomitic materials such as dolomitic limestone, as the bed material, the fraction of magnesium carbonate may also be >10% by weight, with respect to the total weight of the bed material. Dolomite or dolomitic fractions in the bed material have a catalytic property, in that tars produced upon pyrolysis or gasification can be transformed (cracked) into short-chain hydrocarbon compounds. Finally, quartz sand and/or silica sand may be used as the bed material.

During the thermochemical reaction, the corresponding oxides are formed from the carbonates in the starting material for the reactor bed, i.e. more and more calcium oxide is formed from calcium carbonate, so that the fraction of oxides such as calcium oxide, for example, initially increases during the thermochemical reaction, but during the further course of the thermochemical reaction, the oxides particularly on the surface of the particles are increasingly transformed into the corresponding phosphates.

In a preferred embodiment, the calcium-containing particles which are in the reactor prior to the thermochemical reaction as the starting material essentially consist of calcium oxide (CaO)/magnesium oxide (MgO) and/or calcium carbonate ($CaCO_3$)/magnesium carbonate ($MgCO_3$) particles, wherein the quantity of CaO/MgO and/or $CaCO_3$/$MgCO_3$ is preferably >90% by weight.

The calcium-containing particles are preferably present in the form of bulk material, preferably in the bed material of the reactor, in particular as reactive bed material. A preferred bed material is the material described in WO 2009/100937, which preferably consists of micritic lime. The fraction of calcium and/or magnesium-containing particles in the bulk material is preferably 90% by weight, with respect to the total weight of the bulk material. In particular, the quantity of calcium- and/or magnesium-containing particles in the bulk material is selected in a manner such that the phosphorus-binding particles are in a stoichiometric excess with respect to the phosphorus content of the phosphorus-containing material so that as complete a reaction of the phosphorus into phosphates as possible (essentially calcium phosphates and/or magnesium phosphates) is made possible. In the present invention, it was surprisingly discovered that the use in particular of CaO/$CaCO_3$-based fluidized bed materials not only results in positive fluidized bed material properties such as a high catalytic activity and mechanical stability, but also results in a significant increase in the vitrification temperature.

In addition to the calcium-containing particles, as mentioned above, the reactor material may also comprise oxides and carbonates of other metals. Preferred metal oxides are of the $M_xO_y$ type, wherein M designates a metal, for example Sr, Ba, La, Mn or Y, and x and y, as is customary, designate whole numbers.

In further embodiments, the metal oxide may comprise a fraction of iron oxide and/or silicon dioxide. Optionally, it may also contain aluminium oxide.

Preferred carbonates are of the type $M_x(CO_3)_y$, wherein M is a metal such as Sr, Ba, La, Mn or Y, and x and y, as is customary, designate whole numbers.

The calcium-containing particles which are in particular used in the thermochemical reaction in a fluidized bed reactor usually have a mean particle size in the range 0.1 mm to 3 mm, particularly preferably in the range 0.5 mm to 1.5 mm. The particles are preferably essentially free from particles with a particle size of <100 μm, in particular <50 μm, which as a rule constitute a large proportion of the fines which are discharged at the normal gas velocities.

In a preferred embodiment, the calcium-containing particles essentially consist of particles which have a core formed by at least one carbonate and a sheath (or cover) surrounding the core formed from at least one metal oxide. In a further, particularly preferred embodiment, the particles have a core formed by at least one metal oxide and a sheath (or cover) surrounding the core formed by at least one carbonate. Preferably, the sheath (or cover) essentially completely encloses the core.

By means of the thermochemical reaction of the calcium-containing particles in the presence of phosphorus-containing material below the ash softening temperature, phosphorus contained in the phosphorus-containing material is chemically bound in the form of a phosphate and thus rendered useful, for example in the form of calcium metaphosphate ($Ca_2P_2O_7$) or tricalcium phosphate ($Ca_3(PO_4)_2$).

Because binding of the phosphorus contained in the fuel occurs primarily on the surface of the calcium-containing particles, phosphorus enrichment occurs, dictated by the material abrasion during the thermochemical reaction, in the discharge of the reactor such as, for example, in the fluidized bed discharge, or dictated by the material fines entrained with the product gas in the discharge points disposed downstream on the product gas side. Thus, by using the mechanically stable particles described above, the fraction of phosphorus in the fines can be raised, and thus the efficiency of the method can be raised further. Furthermore, with the fines, other fertilizer-relevant substances such as potassium carbonate, potassium phosphate, magnesium carbonate and magnesium phosphate, can be discharged. The fraction of these further fertilizer-relevant substances can advantageously be controlled by means of the fraction of the corresponding metal oxides or metal carbonates in the bulk material.

Since, as already described, the phosphorus enrichment occurs above all by abrasion of the calcium-containing particles, separation of the particles enriched with phosphorus is usually carried out from the reactor discharge, preferably in one or more separation devices such as, for example, in one or more separation devices of a fluidized bed reactor or in the discharge points disposed downstream on the product gas side. Separation of the fines thus occurs in at least one separation device or in a plurality of separation devices connected in series. By binding pollutants such as, for example, the long chain hydrocarbons described above, sulphur, chlorine, fluorine or heavy metals, into the bed material of the reactors, separating the particles enriched with phosphorus from the reactor discharge, means that a phosphorus-enriched product can be obtained which is free from disruptive side products or which only contains a small quantity thereof.

In an alternative embodiment, the phosphorus enrichment may also occur in the bed material of the reactor. In this regard, the bed material binds the phosphorus by forming the phosphate compounds described above in the bed material of the reactor. In FIG. 1, the bed material enriched in this manner is discharged as material stream b via the discharge 10 which is withdrawn directly from the reactor 2.

In a preferred embodiment, the reactor is provided with one or more separation devices which usually operate at different operating temperatures and which may be disposed inside or outside the moving bed reactor. As an example, the temperature of a first separation device may be in the range 500-150° C., preferably in the range 600-700° C., and the temperature of a second separation device may be in the range 100-400° C., preferably in the range 150-250° C.

Separation of the typically particulate fines enriched with phosphorus is primarily carried out from the discharge for the flue gas and/or gasification gas, for example from the fluidized bed discharge, in a first or more separation devices disposed downstream. The operating temperature for the first separation device or plurality of separation devices should preferably be over 400° C., preferably between 600° C. and 1100° C., with respect to a fluidized bed method operated at atmospheric pressure, in order to reduce the quantity of heavy metals, i.e. metals with a density of >5 g/cm$^3$ such as, for example, cadmium, lead, chromium, mercury, arsenic, cobalt and thallium, and/or other pollutants such as, for example polyaromatic hydrocarbons from pyrolysis and/or gasification and/or combustion.

The separation of residual materials such as, for example, residual amounts of calcium-containing particles which have not reacted with phosphorus and/or heavy metals with a density of >5 g/cm$^3$ such as, for example, cadmium, lead, chromium, mercury, arsenic, cobalt, thallium and/or other pollutants such as, for example polyaromatic hydrocarbons from pyrolysis and/or gasification, is usually carried out in a second or more downstream separation devices. The operating temperature of these separation device (s) should preferably be below 400° C., preferably below 200° C.

Depending on the phosphorus content of the material used for the thermochemical reaction, the fines enriched with phosphorus obtained after separation usually have a phosphorus content of 1% to 5% by weight, preferably up to 10% by weight, with respect to the total weight of the fines. Particularly when a phosphorus-rich starting material is used such as sewage sludge, for example, phosphorus contents in the fines of 5-10% by weight may be obtained using the method in accordance with the invention.

In order to improve the phytoavailability of the phosphorus in the fines enriched with phosphorus, the particles may optionally be acidified. In particular, neither calcium metaphosphate ($Ca_2P_2O_7$) nor tricalcium phosphate ($Ca_3(PO_4)_2$) is sufficiently soluble in water, and so these substances do not have direct phytoavailability. The formation of water-soluble $HPO_4^{2-}$ and $H_2PO_4^-$ ions is important in obtaining good phytoavailability. The formation of these ions is obtained in the present invention by adding an acid to the fines. The acid is preferably selected from $CO_2$ or carbonic acid, phosphoric acid, sulphuric acid, nitric acid or combinations thereof.

By using an acid, water-soluble phosphates such as calcium dihydrogen phosphate $(Ca(H_2PO_4)_2)*H_2O$ and calcium hydrogen phosphate $(Ca(HPO_4)*_2H_2O)$ can be formed. In particular, calcium dihydrogen phosphate has a high solubility in water of 18 g/L under standard conditions of 25° C. and 1 bar, and thus is highly phytoavailable. As an example, upon reaction with an acid, in a first step tricalcium phosphate is transformed into calcium hydrogen phosphate, as shown in the following formula (1):

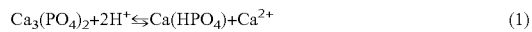

$$Ca_3(PO_4)_2 + 2H^+ \leftrightarrows Ca(HPO_4) + Ca^{2+} \quad (1)$$

In a second step, the reaction may be carried out in phosphoric acid, which is an important starting component in fertilizer production, as shown in the following formula (2):

$$Ca(HPO_4) + 2H^+ \leftrightarrows H_3PO_4 + Ca^{2+} \quad (2)$$

In a preferred embodiment, the acidification is carried out with $CO_2$ or carbonic acid, for example by adding water and $CO_2$. In this regard, the $CO_2$ may, for example, be obtained from biogas, gas from purification plants, flue gas or product gas, in particular from the combustion of the phosphorus-containing material in the method in accordance with the invention. In this regard, it is generally sufficient for the $CO_2$ formed by the thermochemical reaction to be brought into contact with steam which is also formed during the combustion or with moisture from the air prior to acidification, so that an external addition of water is not necessary. By using the $CO_2$ formed during the thermochemical reaction, the efficiency of the method can be further increased and the $CO_2$ dump can be reduced. Particularly in the case when biogas is used, its $CO_2$ content can advantageously be reduced.

In this case, calcium hydrogen phosphate and calcium dihydrogen phosphate are formed in accordance with the following formulae (3) and (4):

$$Ca_3(PO_4)_2 + 3H_2O + CO_2 \leftrightarrows 2Ca(HPO_4) \cdot 2H_2O + CaCO_3 \quad (3)$$

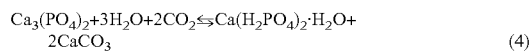

$$Ca_3(PO_4)_2 + 3H_2O + 2CO_2 \leftrightarrows Ca(H_2PO_4)_2 \cdot H_2O + 2CaCO_3 \quad (4)$$

In the reaction represented in formula (3), the thermodynamic equilibrium at 25° C. is completely on the product side even at a system pressure of 1 bar. The graph of the thermodynamic equilibrium of the reaction represented in formula (4) at 25° C. with increasing pressure shows that even at a system pressure of 1 bar, calcium dihydrogen phosphate is formed more strongly. Thus, according to this preferred embodiment, by using the practically freely available substances $H_2O$ and $CO_2$ which have already been formed, calcium hydrogen phosphate and calcium dihydrogen phosphate are formed, i.e. phosphorus in a phytoavailable form.

In a further preferred embodiment, the acidification is carried out in two stages. In this regard, in a first step, acidification is carried out with $CO_2$/carbonic acid, and in a second step, acidification is carried out with a further acid selected, for example, from phosphoric acid, sulphuric acid and/or nitric acid.

The useful or recyclable material enriched with phosphorus obtained by the method in accordance with the invention is of particular application for use as a fertilizer or fertilizer additive such as, for example, as an additive for a multi-nutrient fertilizer or its production by processing the recyclable material enriched with phosphorus which is obtained. In a preferred embodiment, the recyclable material enriched with phosphorus may be used as a fertilizer or fertilizer additive without any further processing. By adding a nitrogen (N) and potassium (K) carrier, and optionally a sulphur (S) carrier, a NPK(S) multi-nutrient fertilizer can in particular be obtained which can be used in any agricultural areas as well as in the garden and ornamental plant areas.

The invention claimed is:

1. A method for recovering phosphorus, comprising the following steps:
   i) thermochemical reaction of a phosphorus-containing material in the presence of calcium-containing particles in a moving bed reactor;
   ii) separation of fines enriched with phosphorus from the moving bed reactor, wherein the separation of the fines enriched with phosphorus is carried out from the reactor discharge in one or more separation devices which are disposed inside or outside the moving bed reactor, wherein a first separation device of the one or more separation devices has an operating temperature above 400° C., in order to reduce a quantity of heavy metals and/or polyaromatic hydrocarbons; and
   iii) reaction of the fines enriched with phosphorus obtained from step ii) with an acid in order to obtain a phytoavailable phosphorus-enriched recyclable material comprising water-soluble phosphates including calcium dihydrogen phosphate ($Ca(H_2PO_4)_2.H_2O$) and calcium hydrogen phosphate ($Ca(HPO_4).2H_2O$) for use as a fertilizer or a fertilizer additive.

2. The method as claimed in claim 1, wherein the thermochemical reaction is carried out at a temperature of up to approximately 1100° C.

3. The method as claimed in claim 1, wherein the thermochemical reaction is carried out in a fluidized bed reactor.

4. The method as claimed in claim 3, wherein the calcium-containing particles have a mean particle size in the range 0.3-3 mm.

5. The method as claimed in claim 1, wherein the phosphorus-containing material is a fuel.

6. The method as claimed in claim 5, wherein the fuel is selected from alternative fuel, biomass, sewage sludge, household waste, industrial waste, fermentation residue, slaughterhouse waste or combinations thereof.

7. The method as claimed in claim 1, wherein the calcium-containing particles essentially comprise CaO and/or $CaCO_3$.

8. The method as claimed in claim 1, wherein the acid is selected from carbon dioxide, phosphoric acid, sulphuric acid, nitric acid or combinations thereof.

9. The method as claimed in claim 1, wherein the phosphorus content of the fines is from 1% to 10% by weight.

10. The method as claimed in claim 2, wherein the thermochemical reaction is carried out at a temperature of from 600° C.-1100° C.

* * * * *